United States Patent [19]

Limare et al.

[11] 4,265,718

[45] May 5, 1981

[54] METHOD FOR PRODUCING HYDROXYLATED NICKEL COMPOUNDS

[75] Inventors: Armand Limare, Rambouillet; François Maillot, Versailles, both of France

[73] Assignee: Societe Metallurgique le Nickel S. L. N., Paris, France

[21] Appl. No.: 110,683

[22] Filed: Jan. 9, 1980

[30] Foreign Application Priority Data

Jan. 9, 1979 [FR] France ................. 79 00380

[51] Int. Cl.$^3$ ................................ C25B 1/00
[52] U.S. Cl. ............................................ 204/96
[58] Field of Search ................................. 204/96

[56] References Cited

U.S. PATENT DOCUMENTS

| 3,414,494 | 12/1968 | Cuenot | 204/96 |
| 3,489,664 | 1/1970 | Popat et al. | 204/96 |
| 3,779,810 | 12/1973 | Kanetsuki et al. | 204/96 |
| 4,176,021 | 11/1979 | O'Sullivan | 204/96 |

FOREIGN PATENT DOCUMENTS 844120  7/1939  France ................. 204/96

OTHER PUBLICATIONS

"Production of Nickel Oxide from Ammoniacal Process Streams," by Illis et al., Canadian Mining and Metallurgical Bulletin, Mar. 1970, pp. 352-361.

*Primary Examiner*—R. L. Andrews
*Attorney, Agent, or Firm*—Fleit & Jacobson

[57] ABSTRACT

A method for the production of hydroxylated nickel compounds from a solution of nickelous ions. In the first stage, a solution of nickelous ions is electrolyzed while the catholyte is maintained at a pH from about 1 to 6 and at a temperature of less than about 50° C. In the second stage, the precipitate obtained during the first stage is recovered. The method is applied to the production of highly pure nickel hydroxide.

15 Claims, No Drawings

METHOD FOR PRODUCING HYDROXYLATED NICKEL COMPOUNDS

BACKGROUND OF THE INVENTION

1. Field of the Invention

The present invention relates to a method for the production of hydroxylated nickel compounds, and, more particularly, to a method for the production of highly pure nickel hydroxide from a solution of dissociated nickel salts. It also relates to the electrolytic preparation of a basic nickel salt having a special structure, its purification, and the preparation of highly pure nickel hydroxide therefrom.

2. Description of the Prior Art

The preparation of oxidized nickel compounds, e.g., the hydroxides, the basic carbonates, the carbonates, and the black and green oxides, is particularly difficult and complex. The complexities involved in the production of the black and green oxides are shown in "Production of Nickel Oxide from Ammoniacal Process Streams", *Canadian Mining and Metallurgical (Journal)*, March 1970, pages 352 to 362. To further complicate matters, the composition of the basic carbonates of nickel, especially its nickel content, disadvantageously varies over time.

The nickel hydroxides, given their proper meaning, do not possess these disadvantages. It is, however, very difficult to prepare them in a pure state. In addition, when prepared from their salts, it is generally impossible to recover the anion with which the nickel ion is associated.

Pure nickel hydroxide is difficult to prepare due, in part, to its gelatinous nature, its poor filterability, and, in part, its tendency to absorb ions present in the medium, i.e., the anions associated with the nickel and the cations associated with the hydroxyls. These problems exist regardless of the method used to introduce the hydroxyl ions—whether it is the addition of a base or the electrolytic decomposition of water; the problems are particularly acute in the electrolytic technique, the subject of Societe Le Nickel's French Pat. No. 1,441,749, which relates to a method for producing nickel hydrate by electrolysis, which employs anodes of nickel mattes in an aqueous electrolyte of a chloride or sulfate of an alkaline of alkaline-earth metal with a low current density, a pH of 8 to 10, and a purifying treatment. This prior art method disadvantageously involves a low electrolytic cell productivity, in addition to the difficulties involved in filtering the hydroxide precipitate, which necessitates thorough washing.

Therefore, one of the objects of the present invention is the provision of basic nickel salt that can be easily filtered and readily converted to a highly pure nickel hydroxide.

Another object of the present invention is the provision of a method for producing this basic salt.

Yet another object of the present invention is the provision of a procedure for converting this basic salt to a highly pure nickel hydroxide.

A further object of the present invention is the provision of a method for producing highly pure nickel hydroxide from a dissociated nickel salt combined with the recovery of the associated anion, and in particular when the anion is chloride.

Still further objects and advantages of the present invention will become apparent upon reading the undergoing specification and claims.

SUMMARY OF THE INVENTION

The present invention relates to a two-stage method for producing hydroxylated nickel compounds. The first stage is an electrolysis. In the first stage, a solution of nickel ions is electrolyzed while the catholyte is maintained at a pH of from about 1 to 6 and at a temperature of less than about 50° C. A precipitate forms in solution during electrolysis. The second stage of the present method involves the recovery of the precipitate which is formed during the first stage.

DESCRIPTION OF THE PREFERRED EMBODIMENTS

As noted above, the present invention relates to a method for producing hydroxylated nickel compounds from a solution of nickel ions. In the method, a solution of nickel ions is electrolyzed, while maintaining the pH of the catholyte at from about 1 to 6 and at a temperature of less than about 50° C., thus forming a precipitate. Then, the precipitate formed during electrolysis is recovered. The pH and temperature conditions are critical, and the present invention can be practiced only within these ranges of pH and temperature.

In fact, the value of the pH greatly affects both the yield and the filterability of the precipitate. Specifically, under too basic pH conditions, the present method precipitates a basic nickel compound that is difficult to filter. When the pH is too acidic, the faradic precipitation yield is very poor. Accordingly, the pH of the catholyte is preferably maintained between about 3 and 4 and most preferably about 3.5, by addition of a mineral acid to the catholyte. Preferably, a mineral acid that corresponds to the anion associated with the nickel ion is employed. It is also possible to provide a system in which the addition of the acid depends on the pH of the catholyte.

The temperature of the catholyte, as noted above, must be less than about 50° C. The temperature of the catholyte preferably is maintained within the range of from about 15° to 35° C., and most preferably from about 20° to 30° C. In a preferred embodiment, provision of a temperature regulation system is advantageous, especially when the energy dissipated by the electrolyte Joule effort is substantial, i.e., when a high current density is employed.

The electrochemical potential of the catholyte must be less than required to oxidize nickelous nickel into nickelic nickel. In accordance with the former state of the art (*Atlas d'Equilibre electrochimique*, by Pourbaix, 1963 ed., p. 331), that latter potential is pressed by the following two equations:

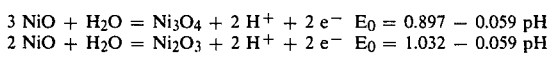

$$3\,NiO + H_2O = Ni_3O_4 + 2\,H^+ + 2\,e^- \quad E_0 = 0.897 - 0.059\,pH$$
$$2\,NiO + H_2O = Ni_2O_3 + 2\,H^+ + 2\,e^- \quad E_0 = 1.032 - 0.059\,pH$$

Therefore, it is preferable to separate the anodic chamber from the cathodic chamber when electrolyzing a solution of nickel chloride with liberation of chlorine at the anode, in accordance with one of the most preferred embodiments of the present invention. This separation can be accomplished by providing a diaphragm or a membrane and/or by controlling the redox potential of the catholyte so nickelous nickel is not oxidized to nickelic nickel. Accordingly, the redox potential of the catholyte is preferably maintained at less than or equal to 400 millivolts in relation to the saturated calomel electrode, for example, by adding, when the redox potential is too high, any appropriate reducing agent, such as, e.g., hydrogen peroxide, ascorbic acid, sodium sulfite, or sodium thiosulfate.

The electrolyzed nickel salt is preferably a salt of a strong mineral acid, such as sulfuric acid, nitric acid, the halohydric acids or their mixtures. In addition, the nickel ion concentration should be less than 50 g/l, and preferably between about 10 and 30 g/l.

To lower the consumption of electric energy in connection with the basic nickel salt, the conductivity of the solution may be increased, e.g., by adding a salt having the same anion as the electrolyzed nickel salt and an alkaline earth, or, preferably, an alkali metal cation, so that it can be neither reduced nor precipitated as a hydroxide or basic salt. One of the simplest and least expensive additives is a sodium salt and, for electrolysis of nickel chloride, sodium chloride.

When maintenance of constant electrolyte volume is required, as, for example, in conducting a purifying process, the added salt becomes a consumable substance. A compromise must, therefore, be reached between the reduction of the amount of energy used per unit of basic nickel salt produced and the increase in consumption of sodium salt. A good compromise is to add the sodium salt so that its concentration is approximately one mole per liter, i.e., 0.5 to 1.5 mole per liter.

Although it is possible to perform the electrolysis in accordance with the present invention at any pressure, it is preferable and more convenient to carry it out at atmospheric pressure.

The current density at the cathode may be very high, as high as 2,000 amps per square meter. This value is a limitation set by the existing state of the art of electrolysis and not a limitation imposed by the present method. Usually, densities of more than 100, and preferably of more than 500 amps per square meter are used.

The cathodes used may be made, e.g., of titanium, of nickel, or of stainless steel. Generally, it is preferable to select cathodes that favor the liberation of hydrogen over the deposition of the metallic nickel.

Agitation of the catholyte near the cathode is very important. It must be neither too strong nor too weak, since the maintenance of the requisite pH would otherwise be difficult, and an excessive amount of acid would be consumed. It is appropriate, however, to note that the agitation connected with the liberation of hydrogen at the cathode seems to be perfectly suitable.

Under the conditions discussed above, the hydroxylated compound, in this case a basic nickel salt, precipitates in large floccules and accumulates at the bottom of the electrolysis chamber. So, it is preferable to modify the chamber to provide the cathode chamber with a slope, and to place a goose-neck at the lower end of the slope, to facilitate the evacuation of the floccules, the filtering of which is very easy.

Regarding the parameters pertaining to the reactions which have not been already discussed, it is preferable to select them to favor the liberation of hydrogen at the cathode over the deposition of metallic nickel.

The anodic reactions have only a small effect on the precipitation of the basic compound. The degree of this effect is such that the anodic reactions do not necessitate any modification of the conditions already discussed. Thus, decomposition reactions of the nickeliferous compounds may occur at the anode. These compounds may be either very pure, e.g., nickel scraps from electroplating (dendrites, scrapped massive electrodes) or impure. For the latter, it is useful to separate the anodic chamber from the cathodic chamber, to provide a purification stage for the anolyte and introduce only the purest possible nickel salt into the cathodic chamber. In fact, most impurities present in nickeliferous solutions are found again in the nickel precipitate obtained at the cathode. Surprisingly, precipitation in accordance with the present invention requires only very little or no purification. Furthermore, the basic nickel salt prepared in accordance with the present invention has remarkable physical and chemical properties, and the present process for its production makes it possible to convert nickel chloride into a hydroxylated compound and to recover chlorine. In addition, the floccules are rather large; more than 70% are larger than 100 microns. The floccules are, therefore, both easily decanted into the electrolysis cell and subjected to further treatment.

Because of those properties perhaps, it is very easy to convert the basic salt into pure nickel hydroxide. The basic salt prepared in accordance with the present invention can be used for certain purposes immediately, without further treatment. Chemical analysis of the basic salt shows that approximately four-fifths of the nickel atoms are linked with hydroxyl ions, while the rest are linked with anions that originate in the solution.

The conversion of the basic hydroxide salt occurs by replacement of those anions by hydroxylated ions which are brought in by a solution of the hydroxide of an alkaline metal, such as caustic soda or potash, or even of ammonia. The reaction tends toward completion when it is carried out at a higher temperature with an excess of hydroxide. Generally, the intermediate hydroxylated compound from the second stage can be purified by any method using a sufficient amount of hydroxyl ion capable of reacting with the basic salt.

To reduce the amount of base required, it is possible to employ at least two reactors in cascade, wherein the nickel hydroxide and the alkaline solution displace one another in countercurrent flow. This technique makes it possible to reduce the required amount of base to between about 1 and 1.2 times the stoichiometric amount, and more specifically to 1.05 times that amount. That method of operation makes it possible to reduce the amount of soda used. In the first reactor, the basic compound uses up the soda that comes from the second reactor, while in the second reactor, inasmuch as the excess of soda in relation to the impurities still has to be eliminated, makes it possible to bestow a high degree of purity on the product coming out.

To conduct the present method under the most favorable conditions, it is necessary to contact in the first reactor the hydroxylated compound with a soda solution having a low concentration coming from the second reactor in order to exhaust the soda and to perform a coarse purification of the hydroxylated compound, and to maintain a high soda concentration in the second reactor, in order to refine the purification.

The period of residence in each reactor depends on the selected technique, the soda concentration, the temperature and the degree of purity desired for the end product, i.e., the nickel hydroxide. In the first reactor, the temperature, the technology of the agitation and the period of residence should be selected so the first reactor effluent, the aqueous phase that comes out of the first reactor, is as weakly basic as possible and so the special morphology of the hydroxylated compound as obtained in the second stage is not adversely affected, to avoid creating difficulties in purification in the second stage. On the other hand, in the second reactor, the operational conditions must be selected based on the desired degree of purity of the final nickel hydroxide, since it is there where the purification of the product is perfected. In particular, it is necessary to reach a compromise between a long residence period and the maintenance of a high soda concentration in the second reactor—a maintenance that presents the risk of a high consumption of base during filtration of the hydroxide.

The temperature of the reactor into which the hydroxylated compound from the recovery stage first enters should be maintained at less than or equal to about 50° C. It preferably and advantageously may be maintained at ambient temperature, i.e., from about 15° to 30° C.

In placing the basic compound in suspension, excessive or violent agitation should be avoided so as not to break the suspended particles. One should, therefore, select an agitation technique which avoids fragmentation of the nickel hydroxide particles, which fragmentation tends to cause difficulty in later washing operations. The temperature of the reactor into which the base is introduced in the first place should be higher than about 50° C. and preferably within the range from about 70° to 90° C. The concentration of base in this reactor should be at least equal to 1 gram equivalent per liter, and preferably should be within the range of from about 1.5 to 5 grams equivalent per liter.

At this stage of the process, the impregnating solution is preferably eliminated by washing with water on the filter or by repulping. A temperature between about 40° and 60° C. is quite appropriate. Approximately three repulping operations, volume by volume, are preferred. After this treatment, the hydroxylated nickel compound is now a nickel hydroxide. The purity of the hydroxide depends both on the purity of the dissociated salt and on the conditions of treatment for the intermediate hydroxylated compound coming from the recovery stage. Accordingly, by treating a hydroxylated compound that has been obtained from highly pure nickel chloride solutions such as those obtained in accordance with the methods described in French Pat. Nos. 2,138,330, 2,138,332, 2,297,925, and 2,334,756, and after conducting three repulping operations in water, one obtains a nickel hydroxide with an impurity level—i.e., the content of elements other than nickel, oxygen and hydrogen—no higher than 0.5% by weight.

A thermic treatment makes it possible to further increase the purity to not more than 0.2% impurities by weight. This treatment consists of heating the hydroxylated compound obtained after the first washing with water to a temperature between about 80° and 180° C., and preferably between about 100° and 150° C., to a constant weight. When an even higher degree of purity is desired, one may increase the number of repeated washings and use ammonia as the base. After drying, possibly in vacuo, at a relatively high temperature (about 80° to 180° C.), this technique makes it possible to achieve impurity levels of less than 0.1%, and even less than 0.05%.

When the hydroxide obtained as described has been filtered once and dried, it is in condition for use. It is quite satisfactory for the needs of the chemical industry, particularly for the manufacture of storage batteries and for the synthesis of certain salts. In addition, it can be substituted, in most instances, for green and black nickel oxide, particularly in applications relating to glass-making, enamels, ceramics and the production of ferrites and in parachemistry. The nickel hydroxide obtained in accordance with the method of the present invention can also be converted into black or green oxide very easily. Black oxide is obtained simply by heating the hydroxide to a temperature of more than 300° C., preferably between about 400° and 500° C. (one significant figure). Green oxide may be obtained easily from the hydroxide by heating it to a temperature of about 1,100° C. (two significant figures).

The following examples have been included to enable one of ordinary skill in the art to easily determine the operational conditions that are appropriate for any particular circumstance. These examples are merely illustrative and are not intended as a limitation on the present invention, which is defined by the appended claims. The examples were conducted in an electrolysis cell having a conical bottom equipped with a goose-neck, a pump to recover the precipitate through the goose-neck in the form of pulp, a decanter, an apparatus for separating liquids and solids and a cooling device which makes it possible to adjust the temperature to the desired value. The temperature adjustment device determines the pulp output. The various solution parameters are maintained at the desired value by a servo-system, while the pH is controlled by the addition of hydrochloric acid. The redox potential is adjusted by the addition of sodium thiosulfate. The nickel level is controlled by the addition of a solution of nickel chloride, the composition of which is identical to that obtained before electrolysis in Example 9 of French Pat. No. 2,334,756. The essential characteristics of the electrolysis cell have been summarized in the following Table:

| | |
|---|---|
| Composition of anode | Graphite |
| Surface of anode | 0.8 dm$^2$ |
| Surface of anodic diaphragm | 1 dm$^2$ |
| Outflow of anodic gas | Aspiration |
| Volume of anolyte | 120 ml |
| Composition of cathode | Nickel |
| Surface of cathode | 0.6 dm$^2$ |
| Outflow of cathodic gas | Strong ventilation |
| Volume of circulating catholyte | 12 l |
| Temperature of catholyte | See examples |
| Output of circulation of the catholyte | 120 l/h |
| Nickel level of the catholyte | See examples |
| Potential of the catholyte in relation to the saturated calomel electrode | 340–430 V |
| Density of cathodic current | See examples |
| Axial distance between anode and cathode | 9 cm |
| Surface distance between anode and cathode | 6 cm |
| Section of complete cell | 175 cm$^2$ |
| Section of attached decanter | 130 cm$^2$ |
| Volume of cell bottom | 4 l |
| Angle of the cone of the cell bottom (cone) | 40° |
| Upward velocity in the decanter (cm/sec) | 0.25 |
| Intensity delivered | See examples |
| Tension at the therminals of the cell | See examples |
| Diaphragm of polyester the permeability of which to air, under a pressure of 20 mm of water, amounts to | 80 m/h |
| Control of the electro-chemical potential of the solution by means of a tiosulfate solution of | 100 g/l |

In the examples, except where otherwise indicated, a solution of nickel chloride having the same purity as in Example 9 of French Patent of Addition No. 2,334,756, i.e. a nickel chloride solution whereof the concent in iron, cobalt, copper, zinc, lead, chromium, aluminum, arsenic is at most $10^{-3}$ g/l, is electrolyzed in the above-described device according to the additional conditions recited therein.

The following analyses are expressed in percent by weight:

EXAMPLE 1 concentration of nickelous ions is maintained constant: 30 g/l
temperature of the electrolyte: 20° C.
density of the cathodic current: 625 A/m²
acidity maintained at pH 3
difference of potential between the electrodes: 3=10 V.

Chemical analysis of the precipitate shows the absence of metallic nickel (Ni=52%; Cl=10%; H+O=-making up to 100%). The faradic yield (equal to the number of nickel equivalents contained in the dry precipitate over the corresponding amount of electricity as expressed in F) is 75%.

EXAMPLE 2 concentration of nickelous ions is maintained constant: 30 g/l
temperature of the electrolyte: 50° C.
density of the cathodic current: 625 A/m²
acidity maintained at pH 3
difference of potential between the electrodes: E=7.6 V.

Visual examination and analysis of the dry precipitate (Ni=71.7%) shows that nickel is present in both the nickelous and metallic state. It, therefore, appears that the temperature was too high, favoring the reduction of the nickelous ions to metallic nickel. Since the nickel was partially precipitated in its metallic form, the faradic precipitation yield is of no interest and, therefore, was not calculated.

EXAMPLE 3

Effect of current density concentration of nickelous ions is maintained constant: 30 g/l
temperature of the electrolyte: 51° C.
density of the cathodic current: 1,200 A/m²
acidity maintained at pH 3
difference of potential between the electrodes: E=12.8 V.

Visual examination and chemical analysis of the dry precipitate (Ni=68.7%) shows that the nickel is present both in the nickelous and metallic state. The proportion of metallic nickel, however, has decreased. Therefore, increasing current density favors the precipitation of nickelous ions in the form of hydroxide over their reduction to the metallic state.

EXAMPLE 4

The electrolysis solution of Examples 4–6 also contains sodium chloride and sodium sulfate. The purity, however, is as indicated above. The other operating conditions are as follows:
concentration of nickelous ions is maintained constant: 18.2 g/l
temperature of the electrolyte: 30° C.
density of the cathodic current: 750 A/m²
acidity maintained at pH 3.5
difference of potential between the electrodes: E=8.4 V
concentration of sodium ions: 30 g/l
concentration of sulfate ions: 8.9 g/l
concentration of chloride ions: 61.7 g/l.

The chemical analysis of the precipitate gives the following results: nickel: 51.9%; sulfur: 4.1%; chlorine: 8.2%; sodium: 1.8%; hydrogen+oxygen: make up 100%.

Sodium is present in the precipitate at a concentration equal to that due to the impregnation of the mother liquors. The median granulometry is 175 microns. The faradic yield of the precipitation is 72.2%. The velocity of the decanting of the floccules is equal to 0.4 cm per second. In the course of this test, 21 g of reducing agent ($Na_2S_2O_3$) were used per kg of nickel precipitate.

EXAMPLE 5 concentration of nickelous ions is maintained constant: 28.4 g/l
temperature of the electrolyte less than or equal to 30° C.
density of the cathodic current: 100 A/m²
acidity maintained between (pH) 3 and 5
difference of potential between the electrodes: E=7.1 V
concentration of sodium ions: 22 g/l
concentration of sulfate ions: 15.3 g/l
concentration of chloride ions: 58.5 g/l The chemical analysis of the dry precipitate gives the following results: nickel: 51%; sulfur: 4.7%; chlorine: 5.4%; sodium: 1.5%; hydrogen and oxygen make up to 100%.

Sodium is present in the precipitate at a concentration equal to that due to the impregnation of the mother liquors. The median granulometry is 125 microns. The faradic yield of the precipitation is 72%. The velocity of the decanting of the floccules is equal to 0.3 cm per second. In the course of this test, 16 g of reducing agent ($Na_2S_2O_3$) were used per kg of nickel precipitate. The consumption of hydrochloric acid required for the maintenance of the pH was equal to 0.68 kg of hydrochloric acid per kg of nickel precipitate.

EXAMPLE 6 concentration of nickelous ions is maintained constant: 17.3 g/l
temperature of the electrolyte less than or equal to 30° C.
density of the cathodic current: 1,000 A/m²
acidity maintained at pH 3.5
difference of potential between the electrodes: E=6.7 V
concentration of sodium ions: 43 g/l
concentration of sulfate ions: 12.7 g/l
concentration of chloride ions: 83 g/l.

The chemical analysis of the dry precipitate gives the following results: nickel: 51.1%; sulfur: 3.2%; chlorine: 9.2%; sodium: 2.1%; hydrogen+oxygen make up to 100%.

Sodium is present in the precipitate at a concentration equal to that due to the impregnation of mother liquors. The faradic yield of the precipitation is 60.3%. In the course of this test, 110 g of reducing agent ($Na_2S_2O_3$) was used per kg of nickel. The consumption of hydrochloric acid required for the maintenance of the pH was equal to 0.68 kg of hydrochloric acid per kg of nickel. These results are certainly explained by a greater diffusion of the anolyte toward the catholyte. The amount of the precipitate, however, is unaffected.

EXAMPLE 7

A product resulting from the electrolysis of a nickel chloride solution to which sodium chloride and sodium sulfate have been added, and having the following chemical composition:

Ni=51%; S=3.2%; Cl=9.5% is treated with a soda solution as follows:

The product is placed in suspension in water at 70° C. during 15 to 30 minutes at the rate of 10 l per kg of nickel content; 10 N soda is added so that an alkaline hydroxide concentration of more than 0.5 N is maintained. The suspension is filtered, and the product is again placed in suspension under the same conditions, while the soda concentration is then maintained at greater than 2.5 N.

Following filtration, the product is placed in suspension in water at 60° C. for 15 minutes; then, the pulp is filtered. The velocity of the filtration is 600 l per hour and per m$^2$ of the filtering surface. The cake is then subjected to a thermic treatment at 120° C. (drying to constant weight). Then, the residual impurities (sodium salts) are eliminated by two treatments with water, each identical to the preceding treatment. Finally, the product is dried to constant weight; its chemical analysis is as follows:

Ni=62%; S=0.05%; Cl=0.09%; Na=0.01%

The median granulometry is 100 microns. In this example, the product has been subjected to the thermic treatment as described above to increase the purity of the final hydroxide.

EXAMPLE 8

A product resulting from the electrolysis of a nickel chloride solution, to which sodium sulfate and sodium chloride have been added, is treated in accordance with the previously described technique in which the product and the base circulate in a countercurrent flow in two reactors. The amount of soda introduced in the form of a concentrated solution of 200 g/l exceeds by 10% the impurities (chloride and sulfate ions) to be eliminated. The temperature of the first reactor is 40° C. The residence time for the product is approximately 1 h 30 min. In the second reactor, the temperature is 75° C. and the residence time for the product is approximately 2 h 30 min. The product from the second reactor is then washed with warm water at 70° C., three times in succession, at a rate of 10 liters of water per kg of nickel content; it is then dried. Its chemical analysis is as follows:

Ni=60%; S=0.08%; Cl=0.21%; Na=0.045%

The purity can be increased by a thermic treatment, identical to that of the preceding example before the two washings with water. The analysis is then as follows:

Ni=62%; S=0.04%; Cl=0.08%; Na=0.020%.

EXAMPLE 9

A solution of nickel chloride having a concentration of 30 g/l is electrolyzed at 20° C., with a current density of 1,500 A/m$^2$. Three successive tests were conducted, varying the pH of the catholyte. The results obtained are summarized as follows:

| pH | Faradic yield of precipitation | Consumption HCl in kg/kg nickel precipitation |
| --- | --- | --- |
| 2.2 | 52% | 0.446 |
| 2.8 | 68% | 0.390 |
| 3.2 | 88% | 0.218 |

The product collected in each instance was easily decanted and filtered. These tests show that the faradic yield of the precipitation improves and the consumption of hydrochloric acid decreases with increasing pH. Other factors such as, e.g., the temperature, the current density, the agitation, and the composition of the electrolyte, must have an effect on the precipitation yield, but, as explained, reasons prevent their modification to further increase the yield.

A test performed under the conditions of Example 9, but at pH 6.5, led to hydrolysis of nickel chloride and resulted in a nickel hydroxide consisting of extremely fine particles which were impossible to decant and very difficult to filter, since the filtering cloth allowed the solids to pass or became clogged. In the case of the electrolysis of nickel chloride, oxidation of the hydroxylated nickel compounds by chloride is favored at a pH of more than 3. The optimum pH for the electrolyte is, consequently, close to 3.

Although one specific embodiment of the present invention has been described above, it should be understood that this embodiment is described for illustrative purposes only and that numerous alterations and modifications can be practiced by those skilled in the art without departing from the scope of the invention. Accordingly, it is the intent that the present invention not be limited by the above, but be limited only as defined in the appended claims.

We claim:

1. A method for producing hydroxylated nickel compounds from a solution of nickelous ions comprising the steps of:
   (a) electrolyzing a solution of nickelous ions while maintaining the catholyte at a pH of from about 1 to 6 and at a temperature of less than about 50° C., whereby a precipitate is formed in the solution; and
   (b) recovering the precipitate from the solution.

2. The method of claim 1, wherein the pH of the catholyte is from about 2.5 to 4.5.

3. The method of claim 1, wherein the temperature of the catholyte is from about 15° to 35° C.

4. The method of claim 1, wherein the concentration of the nickelous ions in the catholyte is from about 10 to 30 grams per liter.

5. The method of claim 1, further comprising the step of controlling the redox potential of the catholyte so nickelous nickel is not oxidized to nickelic nickel.

6. The method of claim 1, wherein the nickelous ions are in the form of a strong mineral acid salt selected from the group consisting of sulfuric acid, nitric acid, halohydric acids and mixtures thereof.

7. The method of claim 1, wherein the catholyte also comprises an alkali metal salt or alkaline earth metal salt, the anion of the salt being the same as that associated with the nickelous ions.

8. The method of claim 1, wherein the precipitate is recovered by means selected from the group consisting of filtration, decantation, centrifugation and use of a cyclone.

9. The method of claim 1 further comprising the step of contacting the precipitate with a base selected from the group consisting of an alkaline hydroxide, ammonia and mixtures thereof.

10. The method of claim 9 wherein from about 1 to 1.2 times the stoichiometric amount of base required to remove residual anions contained in the precipitate is used.

11. The method of claim 9, wherein the contacting step is conducted at countercurrent flow in at least two reactors.

12. The method of claim 11, wherein the reactor into which the precipitate first enters is maintained at a temperature of from about 15° to 30° C.

13. The method of claim 11, wherein the reactor into which the base is first added is maintained at a temperature of from about 70° to 90° C.

14. The method of claim 9, wherein the concentration of hydroxylated ions during the contacting step is at least one gram-equivalent per liter.

15. The method of claim 11, wherein the concentration of hydroxylated ions during the contacting step is equal to at least five gram-equivalent per liter.

* * * * *